UNITED STATES PATENT OFFICE.

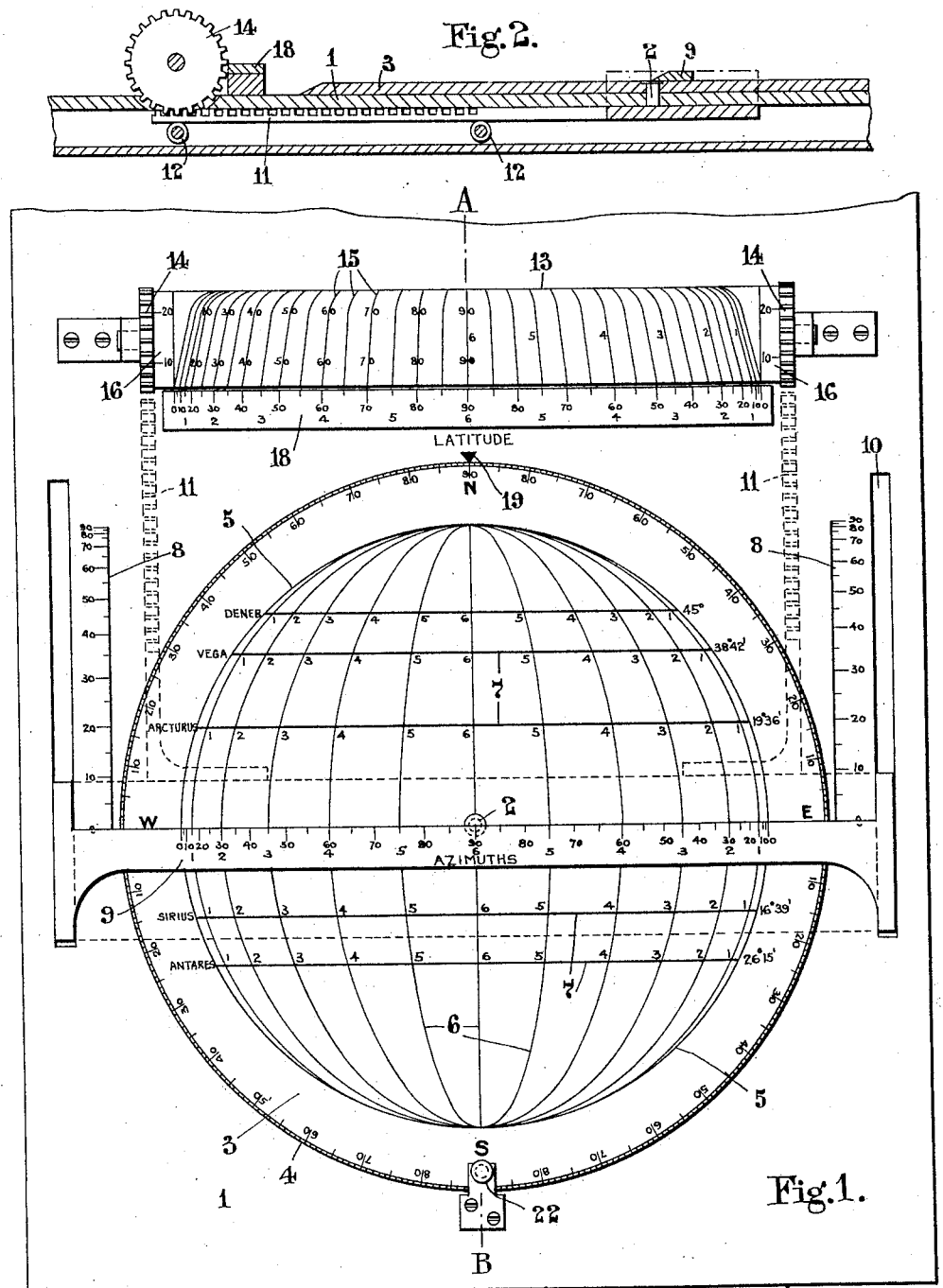

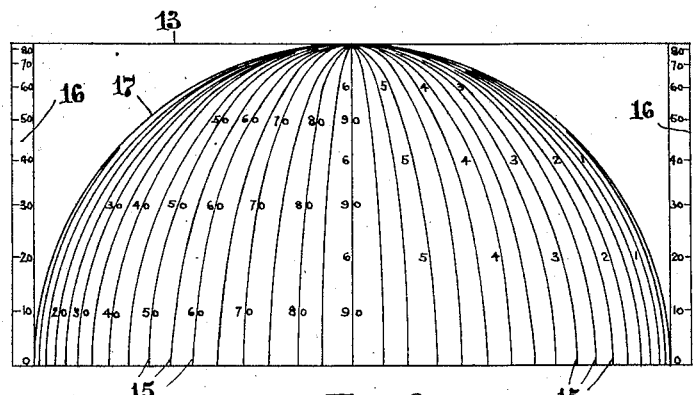
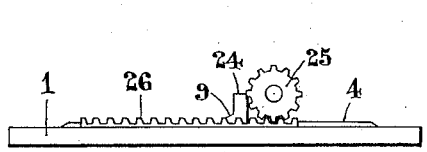
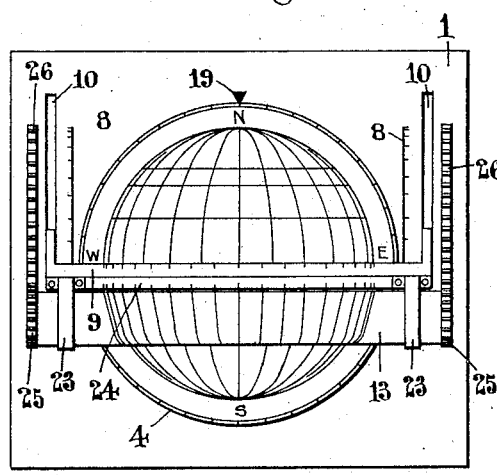
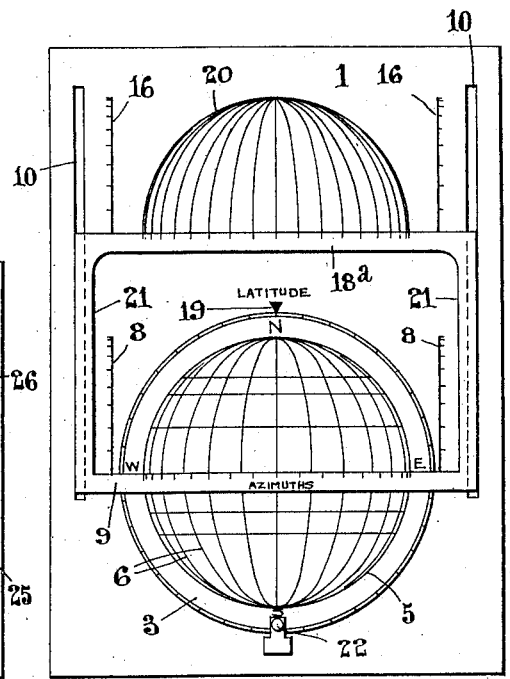

ROBERT ALLON ELDRIDGE, OF HERNE BAY, ENGLAND.

NAVIGATIONAL INSTRUMENT.

1,391,305.   Specification of Letters Patent.   Patented Sept. 20, 1921.

Application filed July 12, 1920. Serial No. 395,702.

*To all whom it may concern:*

Be it known that I, ROBERT ALLON ELDRIDGE, a subject of the King of Great Britain, and residing at Herne Bay, in the county of Kent, England, have invented certain new and useful Improvements in Navigational Instruments, of which the following is a specification.

This invention relates to navigational instruments by means of which it is possible to read off directly the time or hour angle and azimuth when the latitude of the observer and the true altitude of the celestial body from which the observations are being made, are known, or to ascertain a particular celestial body and hour angle when the altitude and azimuth of the body are known.

It is the object of the invention to provide an instrument wherein a declination and time dial is combined with other members for giving readings of azimuth and hour angle, and so forth, this instrument being adapted to be used for working out results from observations made with a separate sextant or the like. The instrument according to this invention provides for the setting being effected and the readings being taken with a minimum of trouble, and with a high degree of accuracy.

In the construction according to this invention, a rotary disk is used which is marked with time lines and lines corresponding to the declination of various celestial bodies. Over this disk is adapted to be moved a slider which is set at the true altitude of a celestial body in respect of which observations are being made, and the point of intersection of this slider and the chord of the celestial body gives the time or hour angle. The slider may serve to turn a cylinder or drum on the surface of which is marked a projection of a hemisphere divided into degrees and time lines from which the azimuth reading may be taken against a stationary scale. If preferred, the cylinder may be arranged to be turned by hand into the necessary positions for making the readings. The slider may also be connected to a second slider which moves over a flat projection of a hemisphere marked in a similar manner to the drum or cylinder.

In the accompanying drawings constructional forms of navigational instruments according to the invention are shown by way of example, wherein:—

Figure 1 is a plan view of one form of construction;

Fig. 2 is a partial section on the line A—B of Fig. 1, the drum being omitted.

Fig. 3 is a developed view of the drum.

Fig. 4 is a plan view of a modified form of construction.

Fig. 5 is a plan view of another modified form of construction; and

Fig. 6 is a side view thereof.

On the base 1 of hard wood, metal or other suitable material which will not be appreciably affected by changes of climate, is pivoted on a stud 2 a disk 3. The disk 3 may be made of celluloid or metal, or of wood with a suitable facing layer, on the surface of which can be marked lines and graduations. The graduations on the disk may be protected by a covering of a transparent substance such as glass, celluloid or the like, which may be removed easily if damaged, or by a coating of varnish or the like. The edge of the disk 3 is graduated around its periphery in degrees as at 4, and if greater accuracy is required the degrees may be sub-divided. The degrees are numbered from 0 to 90 from the points of W to N, W to S, E to N and E to S.

The graduations are adapted to be set against a latitude pointer 19, marked on the base 1, according to the latitude at which the observations are made, as will be described hereinafter.

The graduations need only be around one side of the disk, but they may extend around the whole disk as it is immaterial in which direction the disk is turned in order to set it at the correct latitude at which the observation is being made.

On the disk 3 is also described a circle 5 having the center of the pivot 2 as center. The edge of this circle may be graduated in the same manner as the edge of the disk 3. Within this circle are marked orthographically the time lines 6 and the diurnal lines 7 of a number of celestial bodies. The names of the celestial bodies and the declinations thereof may be indicated opposite their corresponding diurnal lines on the disk 3 in the space between the circle 5 and the graduations 4 as shown in Fig. 1. Chords may also be drawn corresponding to the various declinations which the sun, moon and planets may reach.

At each side of the disk 3 two parallel scales 8 are secured to the base or marked thereon, these scales being marked in degrees which are projected from the graduations around the circle 5 when upright. Cooperating with these scales 8 is a parallel slider 9 adapted to be moved over the disk 3, the slider being divided into degrees adjacent which are also indicated the corresponding time intervals. This slider is guided by slots 10 in the base 1 and carries a pair of racks 11 which are suitably supported by rollers or guide pulleys 12 mounted in the base 1.

At the upper end of the base 1 is revolubly mounted a cylinder or drum 13 to the ends of which are secured toothed pinions 14 gearing with the racks 11 so that the drum 13 may be turned in synchronism with the movement of the slider 9. This drum 13 may however be turned in any other suitable manner by the slider, or it may even be turned into the required positions by hand independently of the slider.

Around the cylinder or drum 13 are marked orthographically degree and hour lines 15 and at the ends of the drum are provided scales 16 corresponding to the scales 8 on the base 1.

Fig. 3 shows the cylinder 13 developed on which the scales and degree and hour lines are preferably formed as follows:

Upon some material which can be easily wound around the cylinder 3 is described a semicircle 17 of the same radius as the circle 5 on the disk 3. This semicircle is then divided orthographically by degree and hour circles 15. On each side of this semicircle are provided the scales 16 which are graduated from 0° to 90° of altitude in the same way as the scales 8. The sheet of material so marked is wound around the cylinder or drum and suitably secured thereto.

On the base 1 and adjacent the cylinder 13 is also provided a scale 18 which is graduated in exactly the same way as the scale on the slider 9, viz. in degrees and hours.

In the modification shown in Fig. 4, the readings are taken from a semi-circular diagram 20 which is marked out in the same manner as described in connection with Fig. 3. The slider 8 is connected by parallel links 21 to a scale 18ª which corresponds to scale 18 in Fig. 1. It will be seen that with this construction the same result will be obtained as with the construction shown in Fig. 1, the only difference being that in Fig. 1 the drum is moved whereas in Fig. 4 the scale 18ª is moved in order to make the readings. In order to lock the disk 3 in position when taking readings, a clamp or brake 22 of any suitable construction may be used.

In the arrangement according to Figs. 5 and 6, the scale 9 has two brackets 23 mounted thereon in which is supported the drum 13 marked as in Fig. 1. In front of the drum and mounted on the slider 9 is a scale 24 graduated similarly to the scale 18 (Fig. 1). At the ends of the drum 13 are secured toothed pinions 25 gearing with stationary racks 26 mounted on the base 1 so that the drum 13 will be turned in synchronism with the movement of the slider 9. The readings with this construction will be taken in the same manner as described in connection with Fig. 1.

For the purpose of illustrating the method of using the instrument the following examples may be given:

It is required to find the hour angle and the azimuth at the time of the following observation: An observation was taken in latitude 30° S. from star Sirius whose true altitude, observed by means of a sextant for example, was 20°. The disk 3 is set with latitude 30° S. opposite the latitude pointer 19 and the scale 9 is moved to the 20° mark on the scales 8. By this movement the cylinder 13 is turned so as to bring the 20° mark on the scale 16 in alinement with the scale 18 in Fig. 1, or the scale 18ª is brought into alinement with the 20° mark on the scale 16, Fig. 4. The point at which the scale 9 intersects the chord of Sirius will be found to be 5 hours 4 minutes (approximately). The corresponding point is also noted on the scale, viz. 82½° approximately. Opposite this point on scale 18 or 18ª on the cylinder 13 or diagram 20, the azimuth 82 can be read off.

This example may be checked as follows: In latitude 30° S. the true altitude of a star whose bearing is N. 82° E. is 20° required the name of the star.

The disk 3 is set at latitude 30° S. and the scale 8 moved to altitude 20°; observe the reading on the scale 18 opposite the bearing 82° on the cylinder 13 which is 82½°. The star whose chord cuts this reading on the sliding scale is the star required, viz. in this case Sirius. The hour angle may also be read off approximately.

To compute the azimuth and altitude of the star Sirius in latitude 30° S. prior to making a twilight observation, when the star would not be clearly visible to the naked eye, it is necessary to set the sextant to the correct altitude and to point it in the correct direction. For this purpose the disk 3 is set to latitude 30° S. and the time of the meridian passage of the star Sirius is obtained from nautical tables. The difference between the time given in the table and the time of observation gives the hour angle of the star. This point is observed in the chord of Sirius and the slider 9 is moved to a position in which it intersects the chord of Sirius at this point. The azimuth and altitude can now be read off in the manner hereinbefore described.

In the case of a star whose diurnal circle lies wholly above the horizon it may not always be apparent to which point on its chord to set the slider as there are two similar points on every chord, one each side of the 6 hour line. This difficulty is overcome by referring to nautical tables and ascertaining whether the star is approaching its upper or lower culmination.

The same method will apply when taking a daylight observation of a planet.

In order to find the initial great circle course and distance from a point in latitude 30° S. and longitude 1° 10′ E. to a point in latitude 16° 39′ S. and longitude 77° 10′ E. the operation is as follows: First of all the difference in longitude between the two objects is found in the present case 76°. This is converted into time = 5 hours 4 minutes.

The disk 3 is set to latitude 30° S. and the point on the chord of 16° 39′ S. corresponding to 5 hours 4 minutes is noted. The slider 9 is moved to a position to cut this point. The azimuth can then be read off giving the initial great circle course, in this case N. and E. The altitude subtracted from 90° and reduced to minutes will give the distance.

Although in the construction hereinbefore described I have stated that the disk 3 is graduated with time and diurnal lines while the slider 9, drum or the like 13, and scales 8 are used for determining azimuth and altitude, it will be understood that the disk may be used for finding the azimuth and altitude, and the slider and drum may be used for finding the hour angles, while the fixed scales 8 could be used for finding the declination.

In the claims appended hereto the separate parts are referred to, for the sake of clearness, as bearing the scales which are shown upon them in the accompanying drawings, but it will be understood that it is intended that the claims should extend also to instruments wherein the disk, drum, slider, scales and so forth, have their scales interchanged in the manner above explained.

Having thus described my invention what I claim as new and desire to secure by Letters Patent is:—

1. A navigational instrument comprising a base, a disk mounted so as to turn on said base, said disk having a plurality of lines representing time angles and the declinations of selected celestial bodies marked thereon and being adapted to be set in various positions according to observations for the purpose of taking readings, a slider slidably connected to the base for parallel movements over the disk, said slider being adapted to be moved over the disk so as to enable readings to be made on the disk, a member having lines representing azimuths marked thereon, and means coöperating with the slider for enabling the azimuth to be read directly from said surface.

2. A navigational instrument comprising a base, a disk mounted so as to turn on said base, said disk having a plurality of lines representing time angles and the declinations of selected celestial bodies marked thereon and being adapted to be set in various positions according to observations for the purpose of taking readings, a slider slidably connected to the base for parallel movements over the disk, said slider being adapted to be moved over the disk so as to enable readings to be made on the disk, a revoluble drum marked with lines representing azimuths, a scale for reading against said drum, and means for turning the drum in synchronism with the movements of said slider.

3. A navigational instrument comprising a base, a disk mounted so as to turn on said base, said disk having a plurality of lines representing time angles and the declinations of selected celestial bodies marked thereon and being adapted to be set in various positions according to observations for the purpose of taking readings, a slider slidably connected to the base for parallel movements over the disk, said slider being adapted to be moved over the disk so as to enable readings to be made on the disk, a revoluble drum marked with lines representing azimuths, a scale for reading against said drum, and rack and pinion gearing between the slider and drum adapted to turn the drum in synchronism with the movement of the slider.

4. A navigational instrument comprising a base, a disk member so as to turn on said base, said disk having a plurality of lines representing time angles and the declinations of selected celestial bodies marked thereon, and being adapted to be set in various positions according to observations for the purpose of taking readings, a slider slidably connected to the base for parallel movements over the disk, said slider being adapted to be moved over the disk so as to enable readings to be made on the disk, a revoluble drum marked with lines representing azimuths, mounted on the base, toothed pinions mounted on said drum, racks carried by the slider and gearing with the toothed pinions, and a scale for reading against said drum.

5. A navigational instrument comprising a base, a disk mounted so as to turn on said base, said disk having a plurality of lines representing time angles and the declinations of selected celestial bodies marked thereon, and being adapted to be set in various positions according to observations for the purpose of taking readings, a slider slidably connected to the base for parallel movements over the disk, said slider being adapted to be moved over the disk so as to enable readings to be made on the disk, scales on said base against which the slider is set for taking readings on said disk, a member having lines representing azimuths marked thereon, and means coöperating with the slider for enabling the azimuth to be read directly from said member.

ROBERT ALLON ELDRIDGE.